Jan. 5, 1954 M. G. HANDSCHIN 2,665,337

TELEPHONOGRAPH WITH ANSWERING DEVICE

Filed Oct. 16, 1950

2 Sheets-Sheet 1

Inventor
Max G. Handschin
By Bryant & Lowry
Attys.

Jan. 5, 1954 M. G. HANDSCHIN 2,665,337

TELEPHONOGRAPH WITH ANSWERING DEVICE

Filed Oct. 16, 1950

2 Sheets-Sheet 2

Inventor
Max G. Handschin
By Bryant & Lowry
Attys.

Patented Jan. 5, 1954 2,665,337

UNITED STATES PATENT OFFICE 2,665,337

TELEPHONOGRAPH WITH ANSWERING DEVICE

Max G. Handschin, Zurich, Switzerland, assignor to Promundo, Schaan, Liechtenstein, a firm Application October 16, 1950, Serial No. 190,358

2 Claims. (Cl. 179—6)

With the telephonographs with answering device so far known at least two impulse periods are provided for reproduction which makes it possible to transmit a second impulse to the telephonograph if the caller should have failed to receive reproduction on the first impulse. This implies that a relatively long time is reserved to the answering device. But this long time is a disadvantage because the telephonic connection with the telephonograph made by the caller is not immediately interrupted when the telephone receiver is replaced but only when the answering device has returned to its starting position.

Another shortcoming of the known answering devices of telephonographs is the inflexible function of such devices which makes it possible to hear reproduction from the device only once. Furthermore, the caller has no choice between reproduction, erasing, recording, new recording, reproduction, etc. in the teleimpulses emitted by him. Nor has it so far been possible to get reproduction repeated without making a new call. And it has not been possible hithereo for the caller to make and hear a recording in the course of a single call (check) or to make a necessary correction or effect an erasure in case he had made a mistake.

These shortcomings are obviated by the present invention which provides for the answering device a magnetic sound carrier tape guided over rollers which carries a message for the caller at a position a certain distance away from the starting position, as well as one filter each for low and high frequencies which are connected by means of circuits with electronic valves, relays and contacts in such a manner that, if after delivery of the message a low-frequency sound is spoken, the message already recorded on the recording sound carrier is erased and, if a high-frequency sound is spoken that message is repeated by the answering device.

Figure 1:
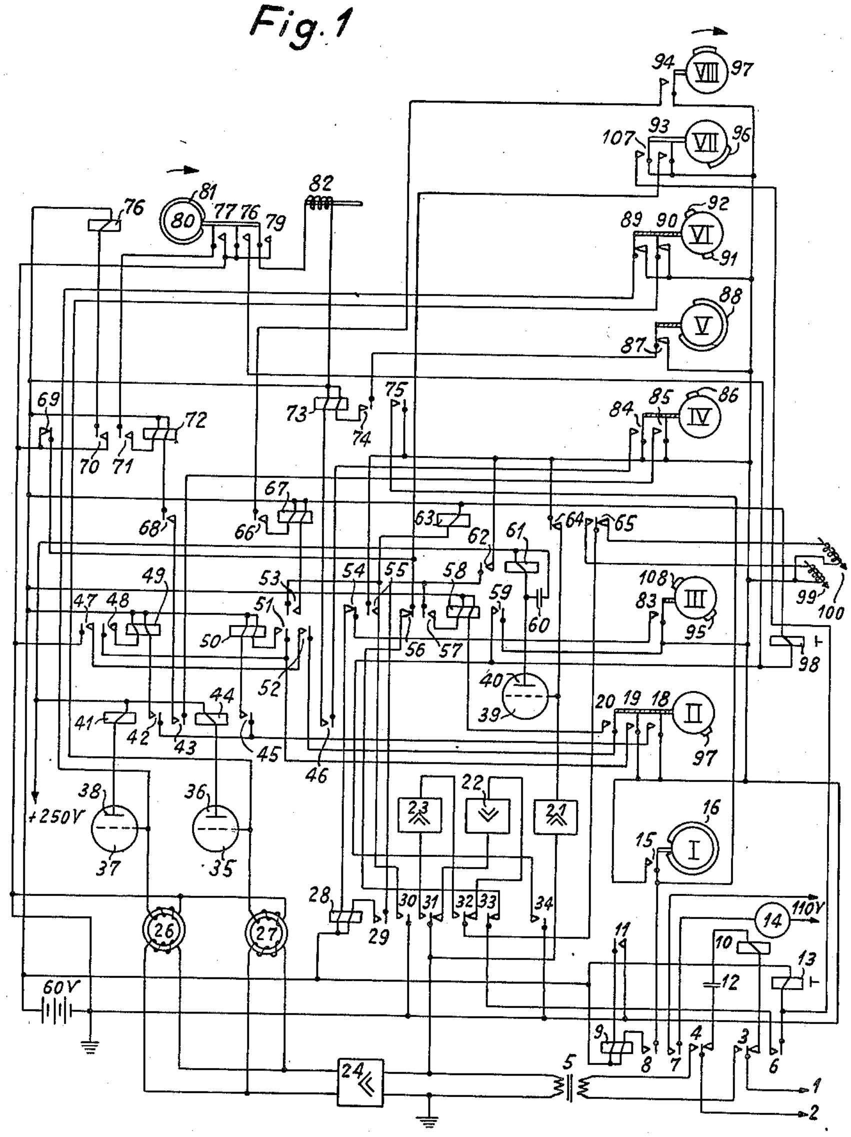
Figures 2, 3:
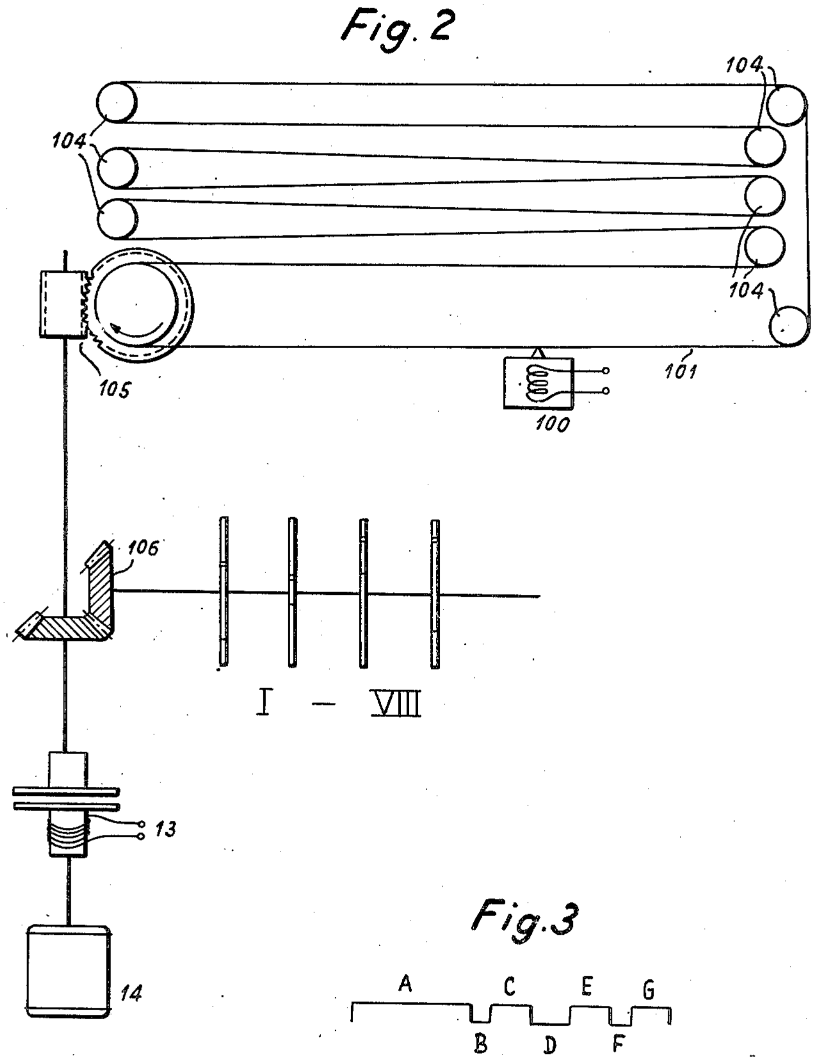

An example of an installation according to the present invention is shown in the accompanying drawing, where Fig. 1 is a wiring diagram of an answering device, Fig. 2 is a diagram representing an answering device, and Fig. 3 is a diagram of an example of the functioning of the answering device according to the invention.

Hereinafter only such parts of a telephonograph are explained in detail as are in direct relation to the answering device and are necessary for its understanding. All other components which are as such known have not been described.

In Fig. 1 details 1 and 2 are two lines over which the telephonograph is connected to the telephone net. If a call is made over these lines, the ringing current emitted by the telephone net excites a relay 10 over contacts 3 and 4 and a condenser 12. Relay 10 closes its contact 11 whereby a further relay 9 is excited over the circuit: earth, contact 11, solenoid winding of relay 9 and battery 60V. Relay 9 reverses its contacts 3 and 4 and closes the contacts 6, 7 and 8. As a result the lines 1, 2 are now connected over the contacts 3, 4 to a repeater 5, so that connection with the telephone net is maintained. The closing of contact 7 connects a motor 14 which begins to revolve while at the same time coupling magnet 13 attracts over the circuit: earth, contacts 69, 56, 33 and 6, coupling magnet 13 and battery 60V and couples the motor 14 with the cam discs I to VIII which are thus set in rotary motion in the direction indicated by the arrow. Motor 14 further actuates a sound carrier 101 not shown in Fig. 1 (see Fig. 2). The relay 9 is now being held over the circuit: earth, contact 15 of cam disc I, contact 8 of relay 9, holding winding of relay 9 and battery 60V. The caller now hears the invitation to record over the circuit: sound head 100 of sound carrier 101, contact 65, contact 32, amplifier 22, contact 31, repeater 5 and earth.

Let it be assumed for a first example that the caller wants to send a message and immediately following to have it repeated to him. Simultaneously with ending the invitation to the caller to start recording the reproduction installation has made itself automatically ready for recording. This is done by excitation of an amplifier reversing relay 28 over the circuit earth, contact 83 of cam disc III, contact 54, solenoid winding of relay 28 and battery 60V whereby a relay 63 is excited over the circuit earth, contact 30 of the amplifier reversing relay 28, relay 63 and battery 60V, which relay reverses its reverse switch 65 whereby the sound head 100 of the answering device is disconnected and the sound head 99 is connected for reception. The excitation of relay 63 further opens a contact 64 whereby the grid 39 of an electronic tube is released. The installation is now ready to receive the caller's message. When the caller now speaks, recording is carried out in known manner by means of sound head 99 over the circuit: lines 1, 2, contacts 3, 4, primary winding of repeater 5, secondary terminal of the repeater 5, contact 31, amplifier 23, contact 32, contact 65, sound head 99 and earthed secondary terminal of repeater 5. As soon as the caller has started sending his message a delayed-release relay 61 is simultaneously excited over the circuit: earth, repeater 5, impulse amplifier 21, grid 39, anode 40, relay 61, terminal +250V. The amplified voice current charges condenser 60 and energizes relay 61. Over the circuit: earth, contact 62, contact 29, holding winding of relay 28, battery 60V, relay 28 is held. The recording sound head is coupled in a known manner through coupling magnet 98 to motor 14 and thus set in motion whereas for the time being the sound carrier of the answering device continues in its travel because coupling magnet 13 remains excited over the circuit: earth, contact 107 of cam disc VII, coupling magnet 13 and battery 60V. However, as soon as contacts 107 and 93 of cam disc VII interrupt, the coupling magnet 13 is de-energised and the sound carrier of the answering device becomes stationary. As soon as the caller has finished his message and ceased to speak, relay 28 is de-energised when condenser 60 is completely discharged after a certain lapse of time by means of the release-delayed relay 61. This de-energises also coupling magnet 98 and the recording sound carrier so that the latter comes to a stop. The release of relay 28 closes its contact 33 once more and the coupling magnet 13 is again excited. The sound carrier of the answering device is set in motion once more and the caller now hears the message "second chance" from the answering device.

Two filters 26 and 27 are provided of which one responds to low frequencies and the other to high frequencies. The purpose of these filters is to cause an erasure or a repetition of the reproduction by the answering device, as desired. Let it be assumed for this purpose that filter 26 is adjusted for low frequencies and for the inception of an erasure, filter 27 being destined for high frequencies and for the inception of a repetition by the answering device.

If, after having heard the message, the caller speaks a word, a number etc., for example of a high frequency, i. e. if he now desires the answering device to repeat his message, then a relay 44 is excited by the following circuit: lines 1. 2, repeater 5, amplifier 24, filter 27, grid 35, anode 36, relay 44, terminal +250V. The two grids 35 and 37 have so far been blocked over the circuit: earth, contacts 89 or 90 respectively, grid 37 or 35 respectively. The excitation of relay 44 closes its contact 46 whereby relay 73 is excited so that relay 9 remains excited, i. e. the connection with the telephone net is maintained over the circuit earth, contact 75 of relay 73, contact 8, holding winding of relay 9, battery 60V. Relay 73 is excited over circuit earth, contact 84 of cam disc VI, contact 46, relay 73, battery 60V. By having its contact 74 closed the relay 73 is held over the following circuit: earth, contact 87 of cam disc V, contact 74, holding winding of relay 73, battery 60V. Consequently the answering device will move on, i. e. it will resume its motion from its starting position. The caller has thus another chance of sending an impulse for repetition. of course controlled by the coding device which is however not shown here. If this impulse is the correct one, i. e. if the caller pronounces the correct code words, two relays 49 and 50 are excited by this impulse. Meanwhile the cam disc VI which continues to rotate interrupts the two contacts 89 and 90, whereby the grid tension of the grids 35 and 37 is rendered nil.

The excitation of relays 49 and 50 takes place in the following way: The caller pronounces his first code word which, let it be assumed, is of a low frequency. Thereby the relay 41 is excited over the filter 26. Relay 41 closes its contact 42 which causes the excitation of relay 49 over the circuit: earth, contact 18 of cam disk II, contact 42, solenoid winding of relay 49, battery 60V. Relay 49 is held over the circuit: earth, contact 19 of cam disc II, contact 48 of relay 49, holding winding of relay 49, battery 60V. The caller now speaks a second word, which, it is assumed here, is of a high frequency. This excites the relay 44 over the filter 27. Relay 44 closes its contact 45, whereby relay 50 is excited over the circuit: earth, contact 18 of cam disc II, contact 45, solenoid winding of relay 50, battery 60V. Relay 50 is held over the circuit: earth, contact 19 of cam disc II, contact 51, holding winding of relay 50, battery 60V.

Meanwhile the opening of contact 87 of cam disc V has de-energised relay 73. After a relay 58 has been excited over the circuit: earth, contact 47, contact 52, contact 20 of cam disc II, solenoid winding of relay 58, battery 60V, the caller will hear a reproduction of the message he has recorded during that call, through the following switch operations. Relay 63 disconnects the sound head 100 of the ansyering device and connects the sound head 99 of that device to the reproduction amplifier 22. Excitation for this purpose of relay 63 takes place over the circuit: earth, contact 55, relay 63, battery 60V. Grid 39 is once more released and relay 61 is excited this time by means of the sound head 99 which reproduces the recorded message, the following circuit becoming operative: earth, sound head 99, contact 65 of relay 63, contact 32, reproduction amplifier 22, contact 31, impulse amplifier 21, grid 39, anode 40, relay 61, terminal +250V.

Meantime the coupling magnet 98 has been excited over the circuit: earth, contact 59, coupling magnet 98, battery 60V and the sound carrier of the answering device again travels until the message "second chance" is reached. As has been described above this effect is obtained by the closing of contact 107 of cam disc VII. Relay 58 is held over the circuit: earth, contact 62, contact 57, holding winding of relay 58, battery 60V. Relays 49 and 50 are again de-energised.

As soon as reproduction is finished, relay 61 will receive no more impulses and is, consequently, de-energised and released with a delay due to the action of condenser 60. Simultaneously with relay 63 another relay 67 was excited over the circuit: earth, contact 55, solenoid winding of relay 67, battery 60V, and held over the circuit: earth, contact 94 of cam disc VIII, contact 66, holding winding of relay 67, battery 60V. During reproduction the relay 67 has no function to perform. Its purpose is to obviate any unauthorised erasure, because erasures should be capable of being carried out only by the owner of the telephonograph, who alone knows the correct code. Once the caller, i. e. in the present case the owner of the telephonograph, has had the recorded message repeated to him, he replaces the receiver. About 3 seconds later the telephone line will again be free, i. e. within that interval the cam discs I to VIII and sound carrier 101 return to their starting positions, contact 15 of cam disc I being opened again whereby all circuits are interrupted.

In a second example let it be assumed that while the caller has his recorded message repeated to him he finds he has made a mistake in transmitting his message which he now wants to erase or which he wants to add to without having to make another call. If he wants to erase a recording he will, as soon as he has received the message "second chance," speak a word, a number etc., with a low frequency. This energises filter 26, or relay 41 respectively. As a result a relay 71 is energised over the circuit: earth, contact 85 of cam disc IV, contact 43 of relay 41, contact 68, solenoid winding of relay 72, battery 60V. The closing of contact 70 of relay 72 excites coupling magnet 76 over the circuit: earth, contact 70, coupling magnet 76, battery 60V, and relay 72 is now held over the circuit: earth, contact 77 of an erasing cam 80, contact 71 holding winding of relay 72, battery 60V. Coupling magnet 76 couples erasing cam disc 80 with motor 14 which turns it in the direction indicated by the arrow, whereby cam disc contacts 77, 78 and 79 are closed. Over contact 79 an erasing magnet 82 is excited which now erases the recorded message. Over contact 78 the coupling magnet 98 is once more excited and the sound carrier is once more set in motion.

If the caller speaks only a word, a number etc. with a low frequency, then the answering device returns to the starting position and disconnects. This procedure is made use of if the caller has no more messages to transmit. However, if the caller wants to transmit another message and check it by having it repeated, he will speak, simultaneously with the order to erase, another word, number etc. with a high frequency, whereupon repetition sets in as already described. If the recording has not been erased and the caller wants to send an additional message, he will not speak any word, number etc. but wait instead for about one second when he will automatically hear another invitation to speak. Cam disc III closes its contact 83 in the manner described above and switches the installation over to reception. When the recording is completed, the answering device returns to its starting position.

Once the caller has incepted a repetition, the reception part of the installation remains blocked. The excitation of relay 58 opens its contact 54 so that relay 28 cannot be excited, although contact 83 of cam disc III is closed.

Fig. 2 is a diagrammatic representation of one design of the answering device, where 14 is the motor which drives a shaft via an electromagnetic coupling 13. On this shaft are mounted a bevel gear 106 driving eight cam discs I to VIII and a worm 105 driving a roller. Over the latter is guided an endless magnetic tape 101 which runs around several guide rollers 104. Opposite to the magnetic tape 101 a sound head 100 is located. As the reference numbers for Figs. 1 and 2 tally it is easy to find the connection between the two.

The diagram in Fig. 3 shows one example of the functioning of the answering device. During the time perod A the message, name, address and place are transmitted. During time period B the installation is given the reproduction impulse. During period C the invitation to speak is heard. Period D is reserved for the first word incepting recording. During period E the message "second chance" is given. Interval F corresponds to the time available for the sending of a low-frequency tone (erasing) or a high-frequency tone (repetition), and during period G the second invitation to speak is heard.

While the invention has been described in detail with respect to a now preferred example and embodiment of the invention it will be understood by those skilled in the art after understanding the invention, that various changes and modifications may be made without departing from the spirit and scope of the invention and it is intended, therefore, to cover all such changes and modifications in the appended claims.

Having thus described my invention, I claim as new and desire to secure by Letters Patent:

1. In combination with a telephonograph, a telephone line, means for connecting a remote caller with said telephonograph, means rendered operative upon establishment of a connection of said caller over said telephone line with said telephonograph to start the operation of the latter, said telephonograph including a sound record and sound reproducing means for reproducing predetermined messages recorded on said sound record in a speaking voice over said telephone line to said caller, said recorded messages being of a nature instructing the caller in two consecutive periods to begin to speak a message to be recorded, relay means actuated by voice currents to enable message recording, and having delay means to maintain the message recording condition for a definite period of time after said voice currents cease, said sound record containing another message, and means operating said sound reproducing means for reproducing said other message after a predetermined period of time, a pair of filter circuits respectively responsive to low and high frequencies and each having input leads and output leads, said input leads being connected to said telephone line, a pair of relay means respectively connected to said filters through said output leads, means actuated by one of said filter circuits through its relay means to erase the message previously recorded by the caller and means actuated by the other filter circuit through its relay means for causing the incoming message previously recorded to be repeated, during the same call.

2. In combination with a telephonograph, a telephone line, means for connecting a remote caller to said telephonograph, said telephonograph including a speech recording means and a separate predetermined message playback means, means rendered operative upon establishment of a connection of said caller over said telephone line with said telephonograph to start the operation of the said playback means for sending a predetermined message out on said telephone line to the caller; circuit controlling means for energizing said speech recording means upon termination of said predetermined message to receive and record an incoming message; relay means actuated by voice currents to maintain energization of said speech recording means and having time delay means for interrupting such energization a predetermined time after cessation of voice currents; relay means for resuming operation of said playback means upon such interruption to transmit a second message to said caller; a pair of filter circuits respectively responsive to low and high frequencies and each having input and output leads, said input leads being connected to said telephone line; relay means respectively connected to said output leads; means actuated by a short signal of suitable incoming frequency through one of said filter circuits to energize its associated relay means to erase the message previously recorded by the caller and means actuated by suitable incoming frequencies through the other filter circuit to energize its associated relay means for causing repetition of the message previously recorded, after said second message.

MAX G. HANDSCHIN.

References Cited in the file of this patent

UNITED STATES PATENTS

| Number | Name | Date |
|---|---|---|
| 2,171,366 | Hipple | Aug. 29, 1939 |
| 2,519,568 | Handschin | Aug. 22, 1950 |
| 2,533,234 | Edwards | Dec. 12, 1950 |
| 2,537,406 | Handschin et al. | Jan. 9, 1951 |
| 2,537,407 | Handschin et al. | Jan. 9, 1951 |